(12) United States Patent
Lopes

(10) Patent No.: US 7,173,989 B2
(45) Date of Patent: Feb. 6, 2007

(54) METHOD FOR REDUCING INTERFERENCE IN A TDD SYSTEM

(75) Inventor: Luis Lopes, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 567 days.

(21) Appl. No.: 10/480,696

(22) PCT Filed: Mar. 18, 2002

(86) PCT No.: PCT/EP02/03087

§ 371 (c)(1),
(2), (4) Date: Dec. 11, 2003

(87) PCT Pub. No.: WO02/103921

PCT Pub. Date: Dec. 27, 2002

(65) Prior Publication Data

US 2004/0174839 A1 Sep. 9, 2004

(30) Foreign Application Priority Data

Jun. 15, 2001 (GB) ................................ 0114673.7

(51) Int. Cl.
*H04Q 7/00* (2006.01)
*H04B 7/216* (2006.01)

(52) U.S. Cl. ...................... 375/346; 370/328; 370/342

(58) Field of Classification Search ................ 375/343, 375/346, 146–148, 350; 370/279–280, 342, 370/344–347, 350, 328; 455/296
See application file for complete search history.

(56) References Cited

U.S. PATENT DOCUMENTS

| | | | | |
|---|---|---|---|---|
| 5,768,254 A | * | 6/1998 | Papadopoulos et al. | ..... 370/201 |
| 5,896,424 A | * | 4/1999 | Uchida et al. | ............... 375/346 |
| 5,995,567 A | | 11/1999 | Cioffi et al. | |
| 6,249,541 B1 | * | 6/2001 | Uchida et al. | ............... 375/148 |
| 6,301,316 B1 | * | 10/2001 | Uchida et al. | ............... 375/347 |
| 6,707,798 B1 | * | 3/2004 | Klein et al. | ................. 370/280 |
| 6,807,222 B1 | * | 10/2004 | Widdowson | ................. 375/147 |
| 2001/0012283 A1 | * | 8/2001 | Miya et al. | ................. 370/342 |

FOREIGN PATENT DOCUMENTS

EP 0 884 855 A 12/1998

* cited by examiner

*Primary Examiner*—Emmanuel Bayard
*Assistant Examiner*—Lawrence B. Williams
(74) *Attorney, Agent, or Firm*—Brian M. Mancini; Steven A. May

(57) ABSTRACT

The amount of interference to communications in Time Division Duplexing (TDD) mode between a TDD mobile and a TDD base station from a mobile operating in Frequency Division Duplexing (FDD) mode that is located near to the TDD base station can be reduced by passing information regarding the interfering FDD signal to the TDD base station, where it is processed and subtracted from the received TDD signal, which includes the interference, so as to obtain the pure TDD signal, as required. Either the FDD data (22), or an FDD signal (23) regenerated from the FDD data or simply the received FDD signal (21) can be passed (24) to the TDD base station. The TDD base station can regenerate an FDD signal, if required, which is then filtered (25) using TDD filters and normalized by correlating (26) and scaling (27) the filtered FDD signal to a received TDD signal. The normalized FDD signal is then subtracted (28) from the received TDD signal to reduce the interference.

25 Claims, 2 Drawing Sheets

METHOD FOR REDUCING INTERFERENCE IN A TDD SYSTEM

FIELD OF THE INVENTION

This invention relates to a method for reducing interference to communications in Time Division Duplexing (TDD) mode between a TDD mobile and a TDD base station, particularly from a mobile operating in Frequency Division Duplexing (FDD) mode that is located near to the TDD base station.

BACKGROUND OF THE INVENTION

In the Universal Mobile Telecommunications System (UMTS) communications between a mobile station, e.g. a cellular telephone, and a base station require both an uplink channel (from the mobile to the base station) and a downlink channel (from the base station to the mobile). It is usual for the channels to be provided either as a Time Division Duplexing (TDD) or a Frequency Division Duplexing system. Often different operators within the same coverage area will have one or both systems available for their customers.

In TDD, a particular frequency channel is divided into time frames, with each frame being subdivided into a plurality of timeslots. Some of the timeslots in each frame are designated for uplinking and some are designated for downlinking, with a particular mobile being allocated particular uplink and downlink timeslots for a particular communication session. Of course, different operators will, in general, have different frequency channels allocated to them.

In FDD, a number of frequencies are available as communication channels and, for a particular communication session with a mobile, the operator will allocate one frequency channel as an uplink channel and one frequency channel as a downlink channel. Those particular frequency channels then remain available all the time for that mobile for the duration of the communication session. Of course, different mobiles may well share the same uplink and downlink channels using different codes.

When a mobile station operating in FDD mode moves about a particular base station coverage area, it is controlled to increase or decrease its transmission power depending on how close to the base station it is at any particular time. It will thus be apparent that if the mobile is at a relatively far distance from the base station, its transmission power will be high. If it should happen that the mobile is close to a base station operating in TDD mode, then any frequency channels available for the TDD communication that are adjacent the FDD uplink channel that the mobile is communicating on will have interference from the FDD mobile due to power leaking across adjacent frequencies from the FDD uplink channel. Such leakage can desensitise the TDD base station by causing it to reduce its reception sensitivity in the TDD frequencies adjacent the FDD uplink channel frequency so that it can no longer adequately receive TDD uplink communication at those frequencies.

This problem can occur even when the FDD mobile is close to the FDD base station if that happens to be co-located or closely located to the TDD base station and the FDD uplink channel has a broad transmission frequency spectrum. One way to overcome the problem is to use very sharp RF filters to preclude or reduce any crossover from the FDD uplink channel to adjacent channels, but such filters can be costly.

BRIEF SUMMARY OF THE INVENTION

The present invention therefore seeks to provide a method for reducing interference to communications in Time Division Duplexing (TDD) mode between a TDD mobile and a TDD base station, which overcomes, or at least reduces, the above-mentioned problems of the prior art.

Accordingly, in a first aspect, the invention provides a method for reducing interference to communications in Time Division Duplexing (TDD) mode between a TDD mobile and a TDD base station from a mobile operating in Frequency Division Duplexing (FDD) mode, the method comprising the steps of receiving an FDD mode communication signal from the FDD mobile, detecting data in the FDD mode communication signal, regenerating an FDD mode communication signal from the detected data, correlating the regenerated FDD mode communication signal with a received TDD communication signal, and utilizing the regenerated FDD communication signal to reduce interference from the FDD communication signal from the FDD mobile on a received TDD communications signal.

According to a second aspect, the invention provides a method for reducing interference to communications in Time Division Duplexing (TDD) mode between a TDD mobile and a TDD base station from a mobile operating in Frequency Division Duplexing (FDD) mode, the method comprising the steps of receiving an FDD mode communication signal from the FDD mobile, filtering the received FDD mode communication signal using a filter at least similar to that used for receiving a communications signal in TDD mode, correlating the filtered FDD mode communication signal with the received TDD mode communication signal, and utilizing the correlated, filtered FDD mode communication signal to reduce interference from the FDD mode communication signal from the FDD mobile on the received TDD mode communications signal.

In a preferred embodiment, the step of receiving an FDD mode communication signal from the FDD mobile takes place at an FDD receiver, which may be located close to the TDD base station or at a location remote therefrom. Furthermore, the FDD receiver may be an FDD base station, but may alternatively be a simple receiver.

BRIEF DESCRIPTION OF THE DRAWINGS

Embodiments of the invention will now be more fully described, by way of example, with reference to the drawings, of which.

DETAILED DESCRIPTION OF THE DRAWINGS

Figure 1:
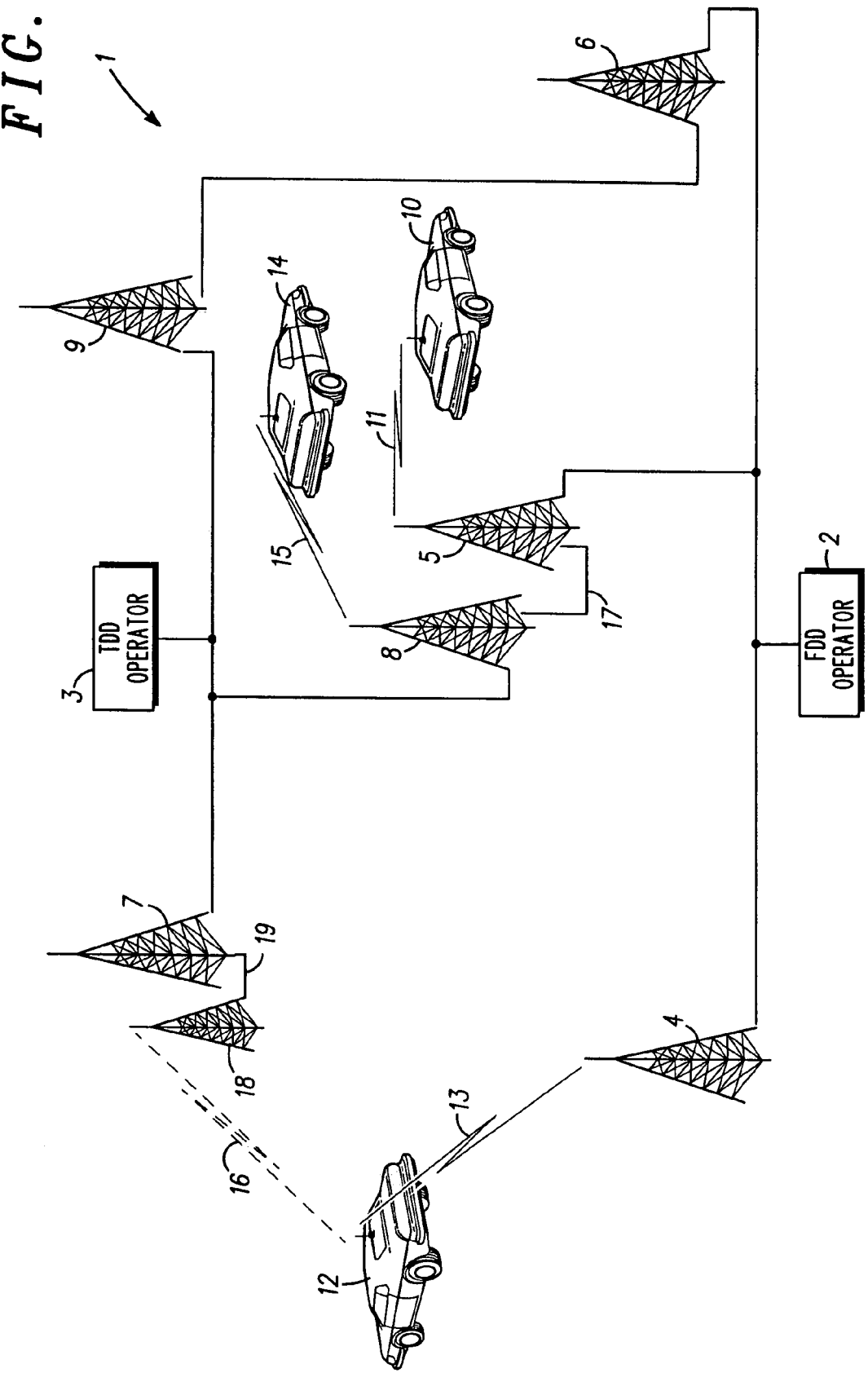
FIG. 1 shows a schematic diagram of a communications system according to embodiments of the present invention.

As shown in FIG. 1, a communications system 1 includes an FDD operator 2 and a TDD operator 3. Each operator has a number of base stations providing limited coverage over a particular area to mobiles operating in FDD and TDD mode, respectively. Thus, FDD operator 2 is coupled to FDD base stations 4, 5 and 6, and TDD operator 3 is coupled to TDD base stations 7, 8 and 9. The base stations are located to provide efficient coverage for the particular operator and may therefore be independently sited so that, in some cases the FDD and TDD base stations will be separated from each other, and in other cases, they may be co-located, as in the case of FDD base station 5 and TDD base station 8.

A first FDD mobile 10 is shown communicating with FDD base station 5, as shown by jagged line 11 and a second FDD mobile 12 is shown communicating with FDD base station 4, as shown by jagged line 13. Similarly, a TDD mobile 14 is shown communicating with TDD base station 8, as shown by jagged line 15. In this example, the FDD base station 5 and the TDD base station 8 are located on the same site, or at least fairly close to each other, as shown. Thus, the FDD communication 11 between the first FDD mobile 10 and FDD base station 5 occurs fairly close to the TDD base station 8. Therefore, as described above, the uplink FDD signal from the FDD mobile 10 to the FDD base station 5 can cause interference on adjacent frequencies used for TDD communication, for example from the TDD mobile 14 to the TDD base station 8. Although this interference may not be very high, since the power level of the FDD mobile 10 would be controlled by the FDD base station 5 to be reduced when the FDD mobile 10 is close to the FDD base station 5, a more serious example is shown where FDD mobile 12 is communicating with FDD base station 4. In this case, the FDD mobile 12 is relatively far from the FDD base station 4, but is relatively close to the TDD base station 7, thus potentially causing interference on adjacent frequencies used by the TDD base station 7, as shown by dotted jagged line 16.

In order to try to reduce the interference caused by the FDD uplink from an FDD mobile located near to a TDD base station communicating with a TDD mobile, information regarding the interfering FDD signal is passed to the TDD base station, where it can be processed and subtracted from the received TDD signal, which includes the interference, so as to try to obtain the pure TDD signal, as required. This can be achieved in several ways.

For example, as shown in FIG. 1, where the FDD base station 5 is located together with, or close to, the TDD base station 8, the FDD signal information can be determined by the FDD base station 5 and then transferred over link 17 to the TDD base station 8. In this case, the TDD base station 8 receives a received TDD signal $Rx_{TDD}$, which is made up of several components:

$$Rx_{TDD} = S_{TDD} + S_{FDD} + N_1$$

where $S_{TDD}$ is the required TDD signal, $S_{FDD}$ is the interfering FDD signal, which may, in general, be a composite of several FDD user signals some of which will be stronger than others (depending on power used and proximity to the TDD base station), and $N_1$ is some noise signal. The FDD base station 5 receives a received FDD signal $Rx_{FDD}$, which is made up of components:

$$Rx_{FDD} = \kappa S_{FDD} + N_2$$

where $S_{FDD}$ is the required FDD signal, $\kappa$ is an amplitude difference and $N_2$ is some noise signal. Although $N_1$ and $N_2$ will not, in general, be the same, nevertheless, their differences will at present be ignored. Therefore, to determine the required TDD signal $S_{TDD}$ from the received TDD signal $Rx_{TDD}$, the interfering FDD signal $S_{FDD}$ and the noise must be subtracted. To obtain the interfering FDD signal $S_{FDD}$ (which may have a phase difference due to differences in receiver circuitry and antenna positions, as well as different filters) from the received FDD signal $Rx_{FDD}$, the amplitude difference $\kappa$ must be removed.

Figure 2:
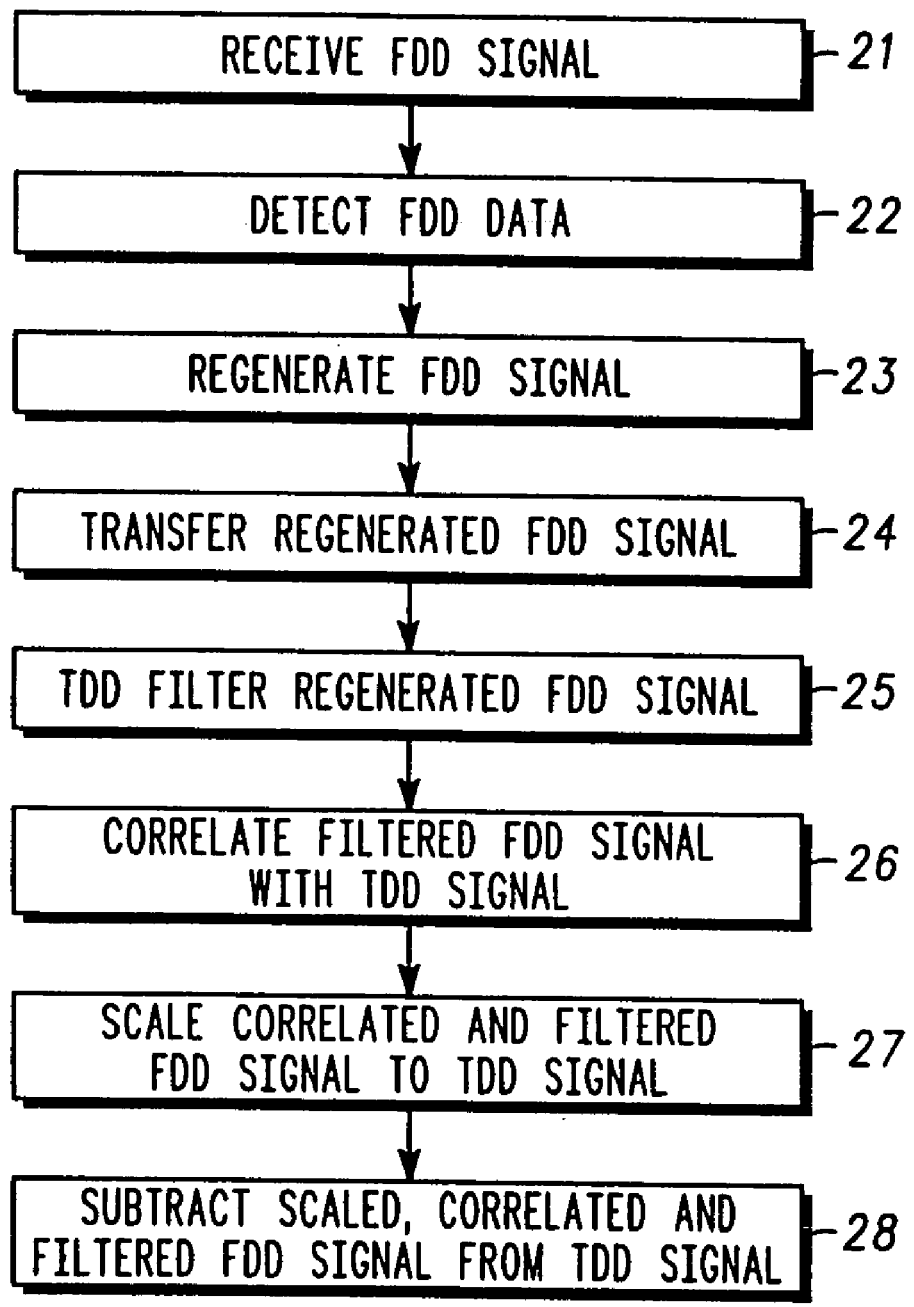
FIG. 2 shows a schematic flow chart of a method of reducing interference to TDD communications in the system of FIG. 1.

Therefore, as shown in the schematic flow chart of FIG. 2, the FDD base station 5, receives the FDD communication from the FDD mobile 10, as shown in step 21, and detects the FDD data signal $S_{FDD}$ in any conventional manner (step 22), as is required for the FDD communication. Now, however, the FDD data signal $S_{FDD}$ is utilized to regenerate (step 23) a signal similar to the received FDD communication signal, which regenerated signal is then passed over link 17 (step 24) to the TDD base station 8. At TDD base station 8, the regenerated signal is filtered, as shown at step 25, using a filter similar to that used to filter received TDD communication signals in TDD base station 8. The filtered signal is then normalized to a received (and filtered) TDD communication signal by correlating (step 26) the filtered regenerated FDD signal with the TDD communication signal to remove the amplitude differences and appropriately scaling (step 27) the filtered regenerated FDD signal. The normalized FDD signal is then subtracted (step 28) from the received and filtered TDD communication signal to provide the required TDD signal $S_{TDD}$ with interference from the FDD signal being minimized.

It will be appreciated that instead of passing the regenerated signal to the TDD base station, the original received FDD communication signal can be used instead. Alternatively, if it is desired not to change the processing that the FDD base station is required to do, it is possible to pass the FDD data signal determined in the FDD base station to the TDD base station, where the step of regeneration can take place.

In an alternative embodiment, as shown in FIG. 1, an FDD receiver 18 can be located adjacent to a TDD base station 7. In this case, the FDD receiver 18 is not a base station connected to the FDD operator network, but is simply a stand-alone FDD receiver and, possible processor, to receive the FDD signal that is received by the TDD base station 7 as interference, and to pass that FDD signal to the TDD base station 7 across link 19 for processing as described above. Of course, the FDD receiver 18 can carry out some of the processing, if desired, as described above, and then pass the results of this pre-processing to the TDD base station over link 19.

In another possible embodiment, an FDD base station 6 which is located at some distance from a TDD base station 9, can provide the FDD data signal determined in the FDD base station 6 over link 20 to the TDD base station 9, where the step of regeneration can take place, as described above. In this case, since there is no FDD receiver near to the TDD base station, the FDD base station can use its knowledge of the location of the TDD base station and of the FDD mobiles communicating with it, to determine which of the FDD mobiles are likely to be causing interference to the TDD base station and then to provide the TDD base station with the FDD data signal(s) only from those FDD mobiles, rather than providing the FDD data signal from all the FDD mobiles that it receives.

It will be appreciated that although only some particular embodiments of the invention have been described in detail, various modifications and improvements can be made by a person skilled in the art without departing from the scope of the present invention.

The invention claimed is:

1. A method for reducing interference to communications in Time Division Duplexing (TDD) mode between a TDD mobile and a TDD base station from a mobile operating in Frequency Division Duplexing (FDD) mode, the method comprising the steps of:

receiving an FDD mode communication signal from the FDD mobile;

detecting data in the FDD mode communication signal;

regenerating an FDD mode communication signal from the detected data;

correlating the regenerated FDD mode communication signal with a received TDD mode communication signal; and utilizing the regenerated FDD mode communication signal to reduce interference from the FDD mode communication signal from the FDD mobile on a received TDD mode communications signal.

2. A method for reducing interference to communications according to claim 1, further comprising the step of:

filtering the regenerated FDD mode communication signal using a filter at least similar to that used for receiving the TDD mode communications signal.

3. A method for reducing interference to communications according to either claim 1 or claim 2, further comprising the step of:

normalising the regenerated FDD mode communication signal to the received TDD mode communications signal.

4. A method for reducing interference to communications according to claim 3, wherein the step of utilizing the regenerated FDD mode communication signal includes at least the step of:

subtracting the normalised regenerated FDD mode communication signal from the received TDD mode communications signal.

5. A method for reducing interference to communications according to either claim 3 or claim 4, wherein the step of normalising the regenerated FDD mode communication signal includes at least the step of:

scaling the regenerated FDD mode communication signal to the received TDD mode communications signal.

6. A method for reducing interference to communications according to any one of claims 3 to 5, wherein the step of normalising the regenerated FDD mode communication signal includes at least the step of:

adjusting the amplitude of the regenerated FDD mode communication signal to match the amplitude of the received TDD mode communications signal.

7. A method for reducing interference to communications according to any preceding claim, wherein the step of receiving an FDD mode communication signal from the FDD mobile takes place at an FDD receiver located close to the TDD base station.

8. A method for reducing interference to communications according to claim 7, wherein the FDD receiver is a base station and the steps of detecting data in the FDD mode communication signal and regenerating an FDD mode communication signal from the detected data take place at the FDD base station, the regenerated FDD mode communication signal then being passed to the TDD base station where the remaining steps take place.

9. A method for reducing interference to communications according to claim 7, wherein the FDD receiver is not a base station and the step of detecting data in the FDD mode communication signal takes place at the FDD receiver, the detected data then being passed to the TDD base station where the remaining steps take place.

10. A method for reducing interference to communications according to any one of claims 1 to 6, wherein the step of receiving an FDD mode communication signal from the FDD mobile takes place at an FDD base station at a location remote from the TDD base station.

11. A method for reducing interference to communications according to claim 10, wherein the steps of detecting data in the FDD mode communication signal and regenerating an FDD mode communication signal from the detected data take place at the remote FDD base station, the regenerated FDD mode communication signal then being passed to the TDD base station where the remaining steps take place.

12. A method for reducing interference to communications according to claim 10, wherein the step of detecting data in the FDD mode communication signal takes place at the remote FDD base station, the detected data then being passed to the TDD base station where the remaining steps take place.

13. A method for reducing interference to communications according to claim 11, further comprising the step of determining the location of the transmitting FDD mobile, wherein the regenerated FDD mode communication signal is only passed to the TDD base station if the transmitting FDD mobile is determined to be located close to the TDD base station.

14. A method for reducing interference to communications according to claim 12, further comprising the step of determining the location of the transmitting FDD mobile, wherein the detected data is only passed to the TDD base station if the transmitting FDD mobile is determined to be located close to the TDD base station.

15. A method for reducing interference to communications in Time Division Duplexing (TDD) mode between a TDD mobile and a TDD base station from a mobile operating in Frequency Division Duplexing (FDD) mode, the method comprising the steps of:

receiving an FDD mode communication signal from the FDD mobile;

filtering the received FDD mode communication signal using a filter at least similar to that used for receiving a communications signal in TDD mode;

correlating the filtered FDD mode communication signal with the received TDD mode communication signal; and utilizing the correlated, filtered FDD mode communication signal to reduce interference from the FDD mode communication signal from the FDD mobile on the received TDD mode communications signal.

16. A method for reducing interference to communications according to claim 15, further comprising the step of:

normalising the correlated, filtered FDD mode communication signal to the received TDD mode communications signal.

17. A method for reducing interference to communications according to either claim 15 or claim 16, wherein the step of normalising the correlated, filtered FDD mode communication signal includes at least the step of:

scaling the correlated, filtered FDD mode communication signal to the received TDD mode communications signal.

18. A method for reducing interference to communications according to any one of claims 15 to 17, wherein the step of normalising the correlated, filtered FDD mode communication signal includes at least the step of:

adjusting the amplitude of the correlated, filtered FDD mode communication signal to match the amplitude of the received TDD mode communications signal.

19. A method for reducing interference to communications according to any one of claims 16 to 18, wherein the step of utilizing the correlated, filtered FDD mode communication signal includes at least the step of:

subtracting the normalized, correlated, filtered FDD mode communication signal from the received TDD mode communications signal.

20. A method for reducing interference to communications according to any one of claims 15 to 19, wherein the step of receiving an FDD mode communication signal from the FDD mobile takes place at an FDD receiver located close to the TDD base station.

21. A method for reducing interference to communications according to any one of claims 15 to 19, wherein the step of receiving an FDD mode communication signal from the FDD mobile takes place at an FDD receiver at a location remote from the TDD base station.

22. A method for reducing interference to communications according to claim 20 or claim 21, wherein the FDD receiver is a base station and the step of filtering the received FDD mode communication signal takes place at the FDD base station, the filtered FDD mode communication signal then being passed to the TDD base station where the remaining steps take place.

23. A method for reducing interference to communications according to claim 20, wherein the FDD receiver is not a base station and the step of filtering the FDD mode communication signal takes place at the FDD receiver, the filtered FDD mode communication signal then being passed to the TDD base station where the remaining steps take place.

24. A method for reducing interference to communications according to claim 20, wherein the FDD receiver is not a base station and the received FDD mode communication signal is passed to the TDD base station where the remaining steps take place.

25. A method for reducing interference to communications according to claim 22, further comprising the step of determining the location of the transmitting FDD mobile, wherein the filtered FDD mode communication signal is only passed to the TDD base station if the transmitting FDD mobile is determined to be located close to the TDD base station.

* * * * *